United States Patent [19]

Bair et al.

[11] Patent Number: 4,547,644
[45] Date of Patent: Oct. 15, 1985

[54] APPARATUS FOR HEATING A PREFORM FROM WHICH LIGHTGUIDE FIBER IS DRAWN

[75] Inventors: Wallace C. Bair, Atlanta; Daryl L. Myers, Lawrenceville; Jane W. Rogers, Atlanta, all of Ga.

[73] Assignee: AT&T Technologies, Inc., Berkeley Heights, N.J.

[21] Appl. No.: 583,532

[22] Filed: Feb. 24, 1984

[51] Int. Cl.[4] .................. H05B 5/00; H05B 6/00
[52] U.S. Cl. .................. 219/10.49 R; 219/10.57; 65/13; 65/374.13; 427/45.1; 373/27; 373/138
[58] Field of Search .............. 219/10.57, 10.49 R, 219/10.41; 126/238; 65/13, 374.13; 427/45.1, 46, 49, 50; 373/27, 138, 139, 140

[56] References Cited

U.S. PATENT DOCUMENTS

| | | | |
|---|---|---|---|
| 4,119,088 | 10/1978 | Sim | 126/238 X |
| 4,126,436 | 11/1978 | Bailey | 65/13 |
| 4,142,063 | 2/1979 | Boniort et al. | 373/140 |
| 4,409,263 | 10/1983 | Aloisio et al. | 427/163 |
| 4,450,333 | 5/1984 | Andrejco et al. | 219/10.49 R |

Primary Examiner—Roy N. Envall, Jr.
Assistant Examiner—M. M. Lateef
Attorney, Agent, or Firm—E. W. Somers

[57] ABSTRACT

An induction furnace (60) for reflowing a portion of an optical preform (12) in order to draw a lightguide fiber (11) therefrom includes a tubular susceptor (80) which is disposed centrally within a beaker (75) and a sleeve (82) which is disposed concentrically about the susceptor. The sleeve is spaced from the susceptor and is surrounded by insulating grain (83). A high frequency coil (84) is energized to couple its electromagnetic field to the susceptor to heat and reflow a portion of the preform. The movement of contaminating particles of the insulating grain into the interior of the susceptor is prevented substantially by annular, felt-like discs (91, 105) at the bottom and top of the beaker. The discs collect particulates which move downwardly and upwardly and because of their compliant engagement with the beaker and with the sleeve, they provide seals at those interfaces. The discs also are effective to prevent inadvertent lateral movement of the sleeve to maintain the concentricity of the sleeve and the susceptor. The top of the furnace is provided with a cap (93) which is supported by the susceptor that extends into a stepped opening of the cap.

15 Claims, 8 Drawing Figures

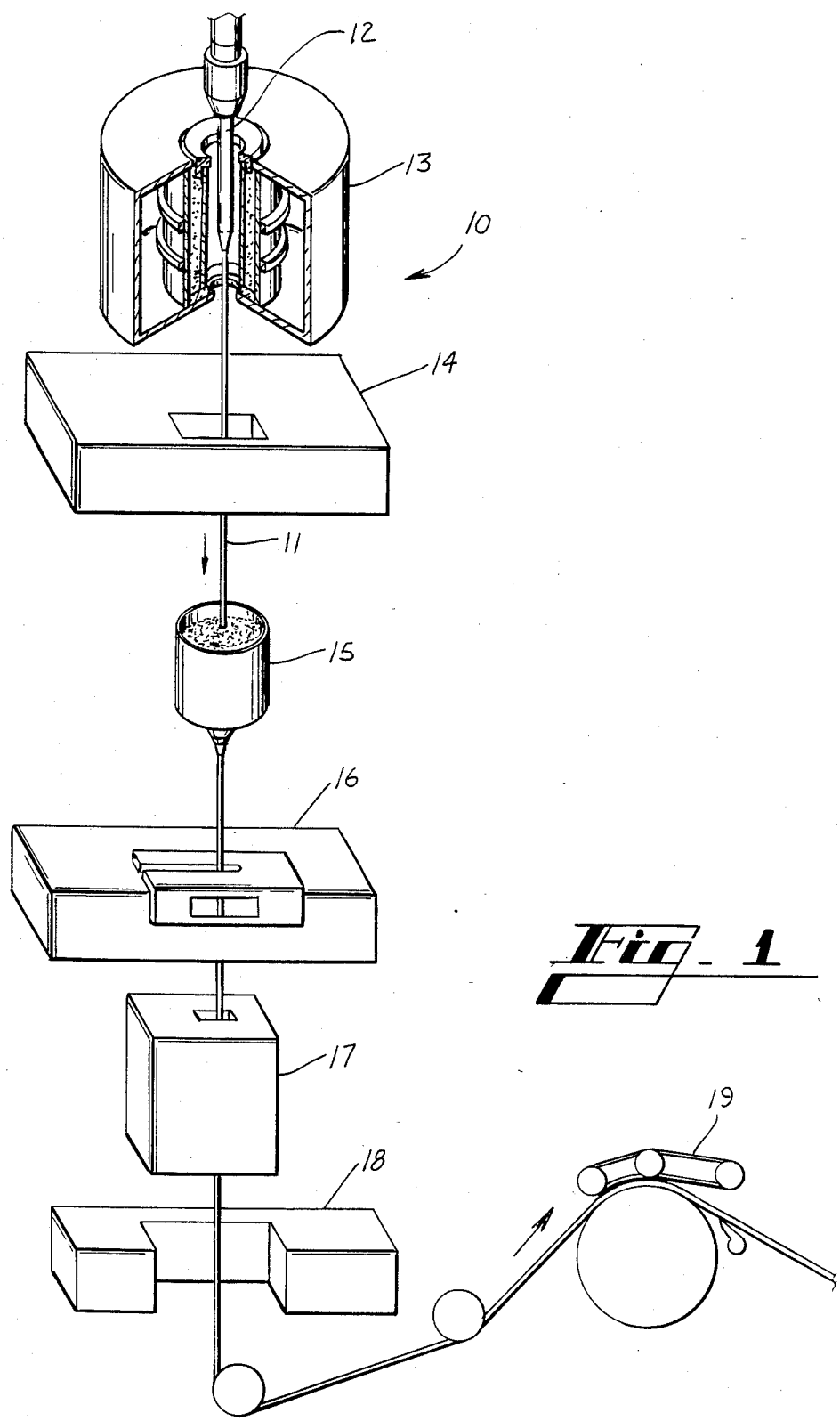
Fig_1

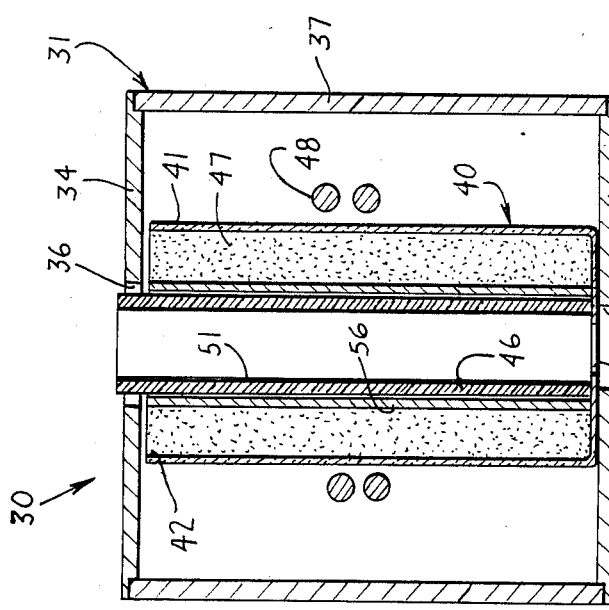
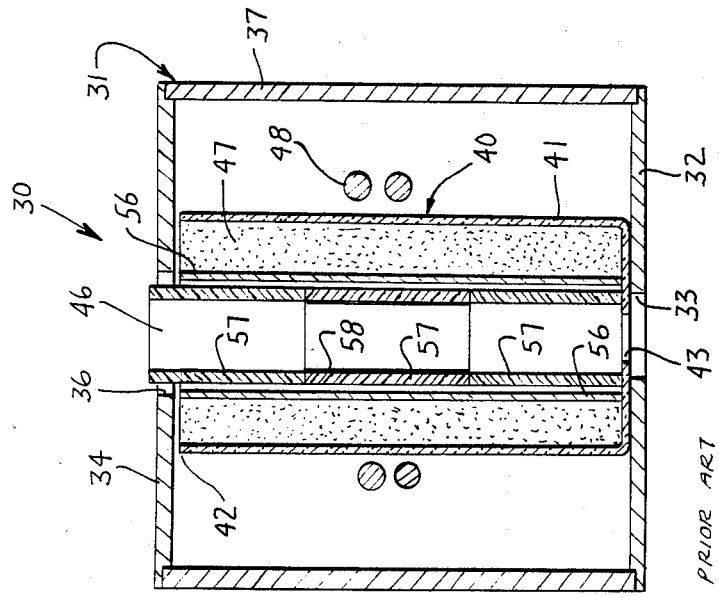

APPARATUS FOR HEATING A PREFORM FROM WHICH LIGHTGUIDE FIBER IS DRAWN

TECHNICAL FIELD

This invention relates to an apparatus for heating a preform from which lightguide fiber is drawn. More particularly, it relates to an induction heating furnace which is adapted to heat an optical preform and which has provisions for reducing significantly contamination of the preform and the lightguide fiber being drawn therefrom.

BACKGROUND OF THE INVENTION

The manufacture of low loss, fused silica lightguide fiber requires the use of relatively high temperature heat sources for the drawing of high strength fiber from a preform. Of the possible heat sources, induction and resistance furnaces have been employed for drawing the silica fibers. However, resistance furnaces which typically are made of carbon require an inert, protective atmosphere to prevent oxidation of the heating element and associated carbon parts.

An induction furnace includes a zirconium dioxide, hereinafter zirconia, tubular susceptor which is surrounded by zirconia insulating material contained in a cylindrical quartz container known as a beaker and which is located centrally in a housing. The insulating material is commonly referred to as insulating grain or grog. An induction coil is mounted about the beaker to provide an alternating electromagnetic field when energized. The field couples to the preheated zirconia susceptor, elevating the temperature thereof and forming a hot zone therein. In a presently used arrangement, a disc which is sized to the preform is positioned across the top of the furnace. This is intended to control the natural draft of the furnace through the susceptor interior, which is called the furnace bore, and thereby control turbulence of the furnace air stream. The disc is removed between preform draws to purge the furnace and to match the disc opening to the preform. A glass preform is then introduced into the hot zone, a portion of the preform is reflowed, and lightguide fiber is drawn therefrom. An induction furnace is described in an article by R. B. Runk entitled "A Zirconia Induction Furnace for Drawing Precision Silica Waveguides" which was published in the *Optical Fiber Transmission II Technical Digest* (TuB5-1), Feb. 22–24, 1977.

The draw furnace has an effect on three fiber parameters-cladding diameter, attenuation and strength. For precise diameter control, the hot zone must be stable and turbulence within the furnace bore must be minimal. Most zirconia furnaces are operated in a normal, room air environment which requires control of air draft, caused by thermal expansion within the susceptor interior. The disc at the top and an extension of the furnace exit control this draft or chimney effect as it is called. Optical attenuation or loss tends to increase at high draw temperatures and low draw tensions. This parameter appears to be under control in presently used furnaces.

In order to preserve fiber strength, it becomes necessary to prevent contamination of the preform and fiber surfaces. If zirconia particles, for example, are permitted to enter the furnace bore, they scratch or become embedded in the hot glass, creating a flaw which is a typical cause of fiber breaks. One source of particles is the susceptor. Microscopic particles of zirconia can become separated from the susceptor if cracks develop due to temperature cycling such as during start up, or aging, or accidental preform or disc contact with the susceptor during changeover of entry discs between preform draws or initial insertion of the preform. Cracks may develop also should a preform bubble comprising entrapped gas expand and break inside the furnace.

Fiber strength has been correlated to furnace life, with longer life furnaces providing higher strength fibers. In a longer life furnace, the average number of particles generated over the operating life of the furnace is minimized. Furnace life may be optimized by using suitable materials, by careful handling and assembly, and by exercising care during start up and during use. These measures minimize the initial contamination of the furnace and the development of relatively large cracks.

From an assembly standpoint, a single tube susceptor is preferred to a segmented one inasmuch as possible contamination paths between the joints of susceptor segments is eliminated. However, the entire tube is exposed to a temperature distribution which peaks at the vertical center of the susceptor and which tails off at upper and lower ends. As a result, without certain precautions, the single tube is more susceptible to cracking than is a susceptor comprising a plurality of segments.

Notwithstanding these measures, it has been found that contaminants continue to find their way into the furnace bore. One such contaminating source is the insulating grain. The grain can enter the furnace bore through cracks in the susceptor wall, or through joints in the susceptor or between the susceptor and the base on which it is supported, or between the top of the susceptor and the end disc through which the preform extends into the furnace bore. Fiber strength is preserved by minimizing the number of access paths for zirconia dust to the furnace bore.

One technique used to reduce the migration of the zirconia particles from the susceptor is described in U.S. patent application Ser. No. 383,386 filed May 28, 1982 in the names of M. J. Andrejco et al and entitled "Zirconia Induction Furnace" and recently issued on May 22, 1984 as U.S. Pat. No. 4,450,333. A porous soot of the same material as that of the lightguide preform is deposited and consolidated on the inner surface of the susceptor. Also, the induction furnace is provided with a sleeve interposed between the insulating grain and the susceptor.

The lower ends of the susceptor and sleeve are supported on a bottom surface of the beaker and form a joint therewith. Because of the manner of support, contaminating dust is likely to enter the furnace bore through this joint. Also, the susceptor and sleeve are capable of shifting laterally on the beaker support surface which could cause inadvertent increases in the size of gaps between the susceptor and sleeve and the beaker base as well as misalignment of the furnace bore with the preform-fiber centerline. Further, their manner of support makes the susceptor and sleeve susceptible to inadvertent tilting which could result in an unwanted gap.

What is needed and what seemingly is not provided by the prior art is a sealing arrangement for each end of the fiber drawing furnace. The sought-after sealing arrangement should be one which is easily assembled to the furnace and which overcomes the problems set forth hereinbefore. Also, the sealing arrangement should be one which minimizes possible damage to elements of the furnace.

SUMMARY OF THE INVENTION

The foregoing problems have been overcome by the apparatus of this invention. A furnace for drawing lightguide fiber from a preform includes a container which includes a sidewall and a base having an opening therethrough. A susceptor in the form of a tubular element for heating a preform which extends into a bore thereof is supported on the base in alignment with its opening and enclosed by the sidewall. Insulation is disposed between the sidewall of the container and the tubular element. The insulation is disposed in engagement with a sealing element which extends across the base and which is in compliant engagement with the sidewall and with the tubular element. The sealing element which in a preferred embodiment is an annular disc prevents the movement of contaminating particulates from the insulation into the bore of the tubular element and prevents inadvertent lateral movement of the tubular element. The annular disc which is made of a felt-like material collects particulates from the insulation and provides seals at its interfaces with the sidewall and the tubular element.

In a sealing arrangement for the top of the furnace, a quartz cap having a stepped, centrally disposed opening is arranged so that a top peripheral rim of the tubular heating element supports the cap by engaging a ledge formed in the stepped opening. The preferred embodiment is such that a lower rim of the cap engages another annular, felt-like disc which encloses the top of an annular chamber between the container and the tubular heating element that is filled with the insulation. A quartz disc through which the preform extends into the furnace is supported in engagement with the top surface of the cap.

In the preferred embodiment, the opening in the container base is stepped to provided a ledge on which the tubular heating element is supported and a sleeve is disposed concentrically about the tubular heating element and spaced therefrom. When a sleeve is used, the annular disc that is supported in engagement with the container base engages an outer surface of the sleeve and an inner surface of the container in a snug fit. Should a sleeve be used with the furnace, the stepped opening in the cap is formed with two ledges, an outermost one of which is engaged by the peripheral rim of the susceptor to support the cap. The sleeve extends toward but is spaced from the innermost ledge of the cap. Also, when a sleeve is used, a segmented tubular susceptor may be used to reduce the possibility of thermal cracking and still be able to prevent substantially the flow of contaminants into the interior of the susceptor.

BRIEF DESCRIPTION OF THE DRAWINGS

Other features of the present invention will be more readily understood from the following detailed description of specific embodiments thereof when read in conjunction with the accompanying drawings, in which:

FIG. 1 is an overall view of apparatus which is used to draw lightguide fiber from a preform;

FIG. 2 is an elevational view partially in section of a prior art induction heating furnace;

FIG. 3 is an elevational view partially in section of another prior art induction heating furnace;

DETAILED DESCRIPTION

Figure 4:
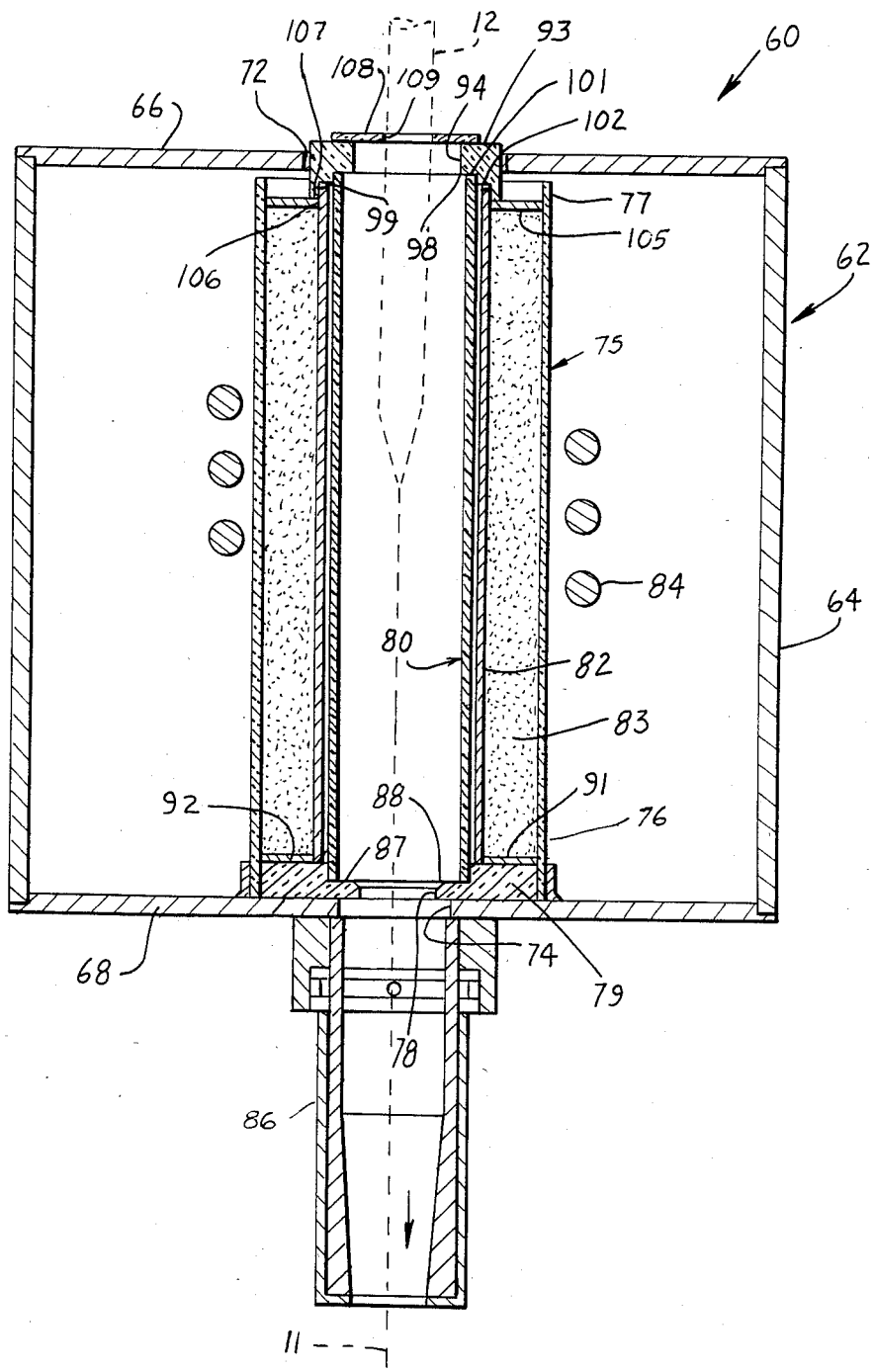
FIG. 4 is an elevational view partially in section of an induction heating furnace of this invention.

Referring now to FIG. 1, there is shown an apparatus which is designated generally by the numeral 10 and which is used to draw a lightguide fiber 11 from a specially prepared cylindrical preform 12 and then to coat the fiber. The lightguide fiber 11 is formed by locally and symmetrically heating the preform 12 which is typically 17 mm in diameter and 70 cm in length to a temperature of about 2000° C. As the preform is fed into and through a furnace 13, fiber 11 is drawn from the molten material portion which is known as the neckdown region. The diameter of the fiber 11 which is measured by a device 14 at a point shortly after the furnace 13 becomes an input into a control system. Within the control system, the measured diameter is compared to the desired value and an output signal is generated to adjust the draw speed such that the fiber diameter approaches the desired value.

After the diameter of the fiber 11 is measured, a protective coating is applied by an apparatus 15. Then, after the coated fiber 11 passes through a centering gauge 16, a device 17 for treating the coating and a device 18 for measuring the outer diameter of the coated fiber, it is moved through a capstan 19 and is spooled for testing and storage prior to subsequent operations.

Referring now to FIG. 2, there is shown a prior art furnace designated generally by the numeral 30. It includes a housing 31 which includes a base 32 having an opening 33, a top 34 having an opening 36 and a sidewall 37. Inside the furnace 30 is disposed a furnace assembly 40 comprising a centrally disposed beaker 41 which is made of silica and which includes an opening 42 at its top and an aperture 43 in a bottom portion thereof. The opening 43 is aligned with the openings 33 and 36 of the housing.

A tubular heating element 46 which is referred to as a susceptor is located centrally within the beaker 41. The annular volume between the inside surface of the beaker 41 and the outer surface of the susceptor 46 is filled with a zirconia insulating grain 47, which also is referred to as insulating grog. An RF induction coil 48, of circular or rectangular cross-section, connected to a power source (not shown), is disposed about the beaker.

One technique used to prevent contaminants from reaching the interior of the susceptor which is commonly referred to as the furnace bore is described in the aforementioned pending U.S. patent application. A layer 51 of soot of the same material as that of the preform exterior is deposited on a center portion of the inside surface of the tubular susceptor and consolidated. Although the mechanism is not fully understood, it is believed that a portion of the consolidated soot coating diffuses into any micro-cracks in the susceptor to form a seal and act as a bond. Additionally, a thin layer of the consolidated soot remains on the surface of the susceptor 46 which substantially precludes particles from leaving that surface and undesirably attaching to the preform or fiber. Advantageously, any deposits of consolidated soot which leave the surface of the susceptor 46 will not affect the drawn fiber inasmuch as both the preform and the consolidated soot are the same material.

Although the aforementioned technique works well when cracks are relatively small, larger cracks do not appear to be sealed. It appears that microscopic zirconia particles from the grain are drawn through the larger cracks by gas flows caused by the aforementioned chimney effect within the susceptor. A further modification has been implemented to reduce the migration of relatively small particles of zirconia from the grain through such large cracks and their deposition on the preform 12 and on the fiber 11.

In FIGS. 2 and 3, a zirconia sleeve 56 is positioned about and in spaced relation to the susceptor tube 46. The distance between the outer surface of the susceptor 46 and the inner surface of the sleeve 56 is not to scale and is exaggerated for purposes of clarity. The sleeve 56 is sufficiently less dense than the relatively high density susceptor so as not to be inductively coupled to the electromagnetic field of the energized coil. The sleeve 56 is comprised of a calicum-stabilized zirconia coarse grain composition such as that manufactured by the Zircoa Products Division of the Corning Glass Works located in Solon, Ohio.

Further, as can be seen in FIG. 3, the single tubular susceptor 46 may be replaced with a plurality of stacked zirconia tubes 57—57. In a preferred embodiment, these stacked tubes are used with a silica soot layer 58 deposited on the inner surface of the middle tube. The use of a segmented susceptor reduces cracking due to the temperature gradient along its length. By segmenting the susceptor, less length is exposed to a temperature gradient and the probability for cracking due to thermal gradient is reduced. The sleeve 56 acts as a barrier to any microscopic particulates from the grain 47 not only that might be otherwise drawn through larger unsealed cracks in the susceptor but also through gaps that might exist if the susceptor is comprised of segments rather than one continuous tube.

Notwithstanding the foregoing improvements to the induction furnace, problems still exist. It has been found that zirconia particles from the susceptor and/or the insulating grain continue to find their way into the furnace bore and become deposited on or scratch the preform and/or the drawn fiber. It is believed that the small zirconia particles enter the furnace bore through joints formed at the interface between the lower end of the susceptor and the beaker base. Also, these particles may move upwardly between the sleeve and the susceptor and enter the furnace bore through micro-cracks in the susceptor. Futher, zirconia dust may move over the top end of the sleeve and past the susceptor and contact the preform. Such contamination results in low strength fiber and substantially decreases fiber production yields.

Referring now to FIG. 4, there is shown in detail a high temperature induction furnace which embodies the principles of this invention and which is generally referred to by the numeral 60. The furnace 60 includes a cylindrical housing 62 having a sidewall 64, a top portion 66 and a bottom portion 68. The housing 62 may be fabricated from copper which is water cooled, or the like, and which also acts as a shield to reduce stray radio-frequency fields. The top portion 66 includes a central opening 72 (see also FIG. 5) which is aligned vertically with an opening 74 in the bottom portion 68. A silica beaker 75 which includes a sidewall 76 is open at a top portion 77 and has a circular aperture 78 in a bottom portion or base 79 thereof which is axially aligned with openings 72 and 74. The beaker sidewall 76 is flamesealed to the beaker base 79.

A tubular suscpetor 80 which may comprise a single segment (see FIG. 4) as in the preferred embodiment or a plurality of segments 81—81 (see FIG. 6) is located centrally within the beaker 75. The susceptor 80 is a yttria stabilized zirconium dioxide composition such as one produced by the Zircoa Products Division of the Corning Glass Works located in Solon, Ohio. In the preferred embodiment, the susceptor 80 is enclosed by a sleeve 82 which is disposed concentrically about the susceptor. The sleeve 82 is spaced slightly from the susceptor, the spacing shown in the drawings being exaggerated to prevent fusing of the sleeve and the susceptor which may result in the premature failure of the susceptor. The annular volume between the inner surface of the beaker 75 and the outer surface of the sleeve 82 is filled with a zirconia insulating grain 83. The grain 83 may be electrically fused monoclinic zirconia such as that manufactured by TAM Ceramics of Niagara Falls, N.Y.

An RF induction coil 84, of circular or rectangular cross-section, connected to a power source (not shown) is mounted about the beaker 75. Generally, the beaker 75 is disposed in the coil 84 such that the coil is located at the verticl midpoint of the tubular susceptor 80. The low temperature resistivity of the zirconia susceptor 80 is too high to directly couple to the alternating electromagnetic field. For this reason, the zirconia susceptor is preheated by coupling to a carbon rod (not shown), axially inserted therein, at room temperature. Above 1000° C., the zirconia susceptor begins to couple to the electromagnetic field and at approximately 1400° C., the carbon rod can be withdrawn without thermally shocking the susceptor. The susceptor is now sufficiently conductive and coupled directly to the electromagnetic field and therefore can be raised to the operating temperature.

During the drawing operation, the temperature of the zirconia susceptor 80 is monitored and controlled with an infrared pyrometer (not shown) to within plus or minus 2° C. of a desired set point. Fiber drawing temperatures normally are between 1900° C. and 2200° C., depending upon the size of the preform and the speed and tension at which the fiber is drawn. At these temperatures, typically 7 kilowatts of power are required for maintaining a steady state operation. Frequencies on the order of about 4 megahertz are required for efficient operation at those temperatures. Because the RF field is not coupled to the high resistivity grain which has a relatively large particle size and is coarse, the grain acts as an insulator to maintain an elevated temperature within the susceptor during the operation.

Once the temperature within the susceptor 80 has reached the desired level, a solid, substantially cylindrical, silica lightguide preform 12 is axially inserted into the furnace until a lower end thereof is positioned at a hot zone which is located centrally in the susceptor within the RF coil 84. The elevated temperature heats the preform to reflow a small volume at the end thereof from which a lightguide fiber 11 is drawn.

The furnace 60 also includes provisions for reducing air drafts through its bore. If left unabated, these could result in turbulence which would have an adverse effect on the drawing operation. As can be seen in FIG. 4, an extension 86 depends from the underside of the bottom portion 68 and is designed to reduce air drafts through the furnace.

Figure 5:
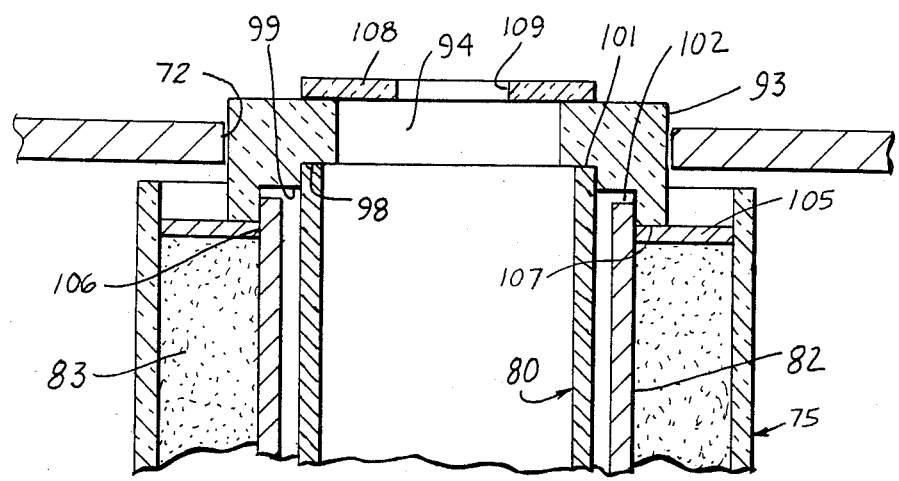
FIG. 5 is a detail view of a top portion of the furnace which is shown in FIG. 4.
Figure 6:
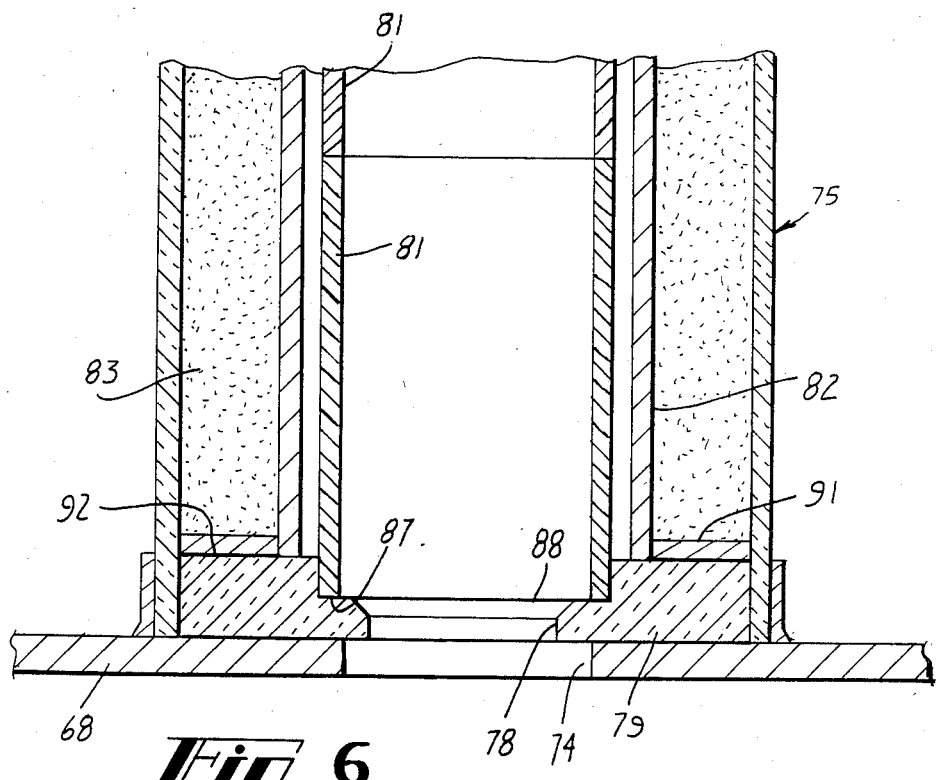
FIG. 6 is a detail view of a bottom portion of the furnace which is shown in FIG. 4 with a modified heating element.

Referring again to FIG. 4 and also to FIGS. 5 and 6, it is seen that the furnace 60 is further modified in order to prevent the escape of contaminants in the form of dust particles from the insulating grain, for example, into the furnace bore. It can be seen that the beaker base 79 is supported on the housing portion 68. The aperture 78 in the beaker base 79 is stepped therethrough to form a ledge 87 on which a lower peripheral rim 88 of the susceptor 80 is supported.

Advantageously, the supporting arrangement for the susceptor 80 at the base 79 helps to prevent any inadvertent lateral movement across the base and to maintain alignment of the furnace bore with the preform 12 suspended above the furnace. Also, this arrangement helps to prevent inadvertent tilting of the susceptor during assembly of the furnace or during changeover of preform discs between draws and thereby reduces the movement of dust into the interior of the susceptor.

Notwithstanding the above-described supporting arrangement for the susceptor 80 within the counterbored aperture 78 at the base 79, a path for contaminating particulates still exists. Placing an annular, felt-like disc 91 (see FIGS. 4 and 6), snugly about the sleeve 82 at the lower end and the inside bottom surface 92 of the base 79 blocks this path. The disc 91 is made of a relatively high temperature-resistant material such as alumina-silica or zirconia, for example, in fibrous form. As such, it is porous and functions to filter out zirconia particulates.

The annular disc 91 effectively prevents the movement of contaminating particulates of the insulating grain into the furnace bore. This is accomplished in two ways. First, the felt-like disc 91 acts to trap or collect particulates from the insulating grain that might otherwise move through it. Secondly, it is in compliant engagement with the beaker sidewall 76 and with the sleeve 82. At those interfaces, it thereby provides effective seals which block the movement of particulates around the disc.

The disc 91 must be sufficiently thick to have structural integrity. In the preferred embodiment, the thickness of the disc is about 0.32 cm. Also, it must have sufficient exposure to the insulation so that its particulate collection function reduces the concentration of the particulates at the seals. This latter requirement is satisfied by making the disc 91 coextensive with the insulating grain 83 in a radial direction.

In addition to preventing the movement of particulates into the furnace bore, the disc 91 has another function. It acts as a spacer to maintain the sleeve 82 in concentric, spaced alignment with the susceptor 80 which is aligned with the top and bottom openings through the furnace. But for this, the sleeve 82 could engage the susceptor 80 and the two could become fused together thereby possibly shortening the life of the susceptor. Although it is made of felt-like material, the disc 91 is sufficiently stiff to resist any lateral movement of the sleeve 82.

The top of the furnace 60 also is modified to prevent damage to the susceptor tube 80 between draws and to prevent the movement of dust onto the preform. Accordingly, a cap 93 (see FIGS. 1 and 5) is supported above the furnace bore. The cap 93 has an opening 94 formed centrally thereof. The opening 94 is large enough to accommodate all expected sizes of preforms 12—12.

It should be observed that the opening 94 of the cap 93 also is stepped to provide a ledge 98 and a ledge 99. An upper peripheral rim 101 of the susceptor 80 engages the ledge 98 to support the cap 93. An upper peripheral rim 102 of the sleeve 82 extends toward but is spaced from the lowermost ledge 99. This avoids the necessity of close tolerances of the ledges 98 and 99 if the peripheral rims of both the susceptor 80 and the sleeve 82 were to engage the cap 93.

A second annular, felt-like disc 105 (see FIGS. 4 and 5) which is positioned at the top of the beaker 75 and which covers the insulating grain 83 prevents particles from being carried by random air currents as a result of the chimney effect or the ambient air, or stray air currents. This disc 105 also serves as a retainer for the top end of the sleeve, thus maintaining more precisely the alignment of the furnace bore with the preform 12.

As can be seen in FIGS. 4 and 5, the annular disc 105, which is similar to the disc 91, is disposed above the insulating grain 83. An inner surface 106 of the disc 105 engages the outer surface of the susceptor 80 and an outer surface engages the inner surface of the beaker sidewall 76. A lower surface 107 of the cap 93 engages the top surface of the disc 105. This arrangement, which is similar to that adjacent to the base 79, provides for the collection of particulates and provides seals to prevent the movement of particles of the insulating grain 83 around the disc 105 into the furnace bore and preform region.

Supported in engagement with the cap 93 is a disc 108 which in a preferred embodiment is made of quartz and which is sized to the preform 12 from which lightguide fiber 11 is to be drawn. The quartz disc 108 is significantly thinner than the cap 93 and is disposed symmetrically with respect to the quartz cap with its opening 109 aligned with the centerline of the furnace 60.

It will be recalled that the quartz disc 108 is changed between preform draws and is sized to minimize the spacing between the preform and its central opening. As has been mentioned previously, the top end of the susceptor 80 is subject to accidental damage during changeover between preforms. By interposing the cap 93 between the susceptor 80 and the disc 108, the possibility of damage to the susceptor is reduced when the disc is replaced between draws.

These developments have provided a zirconia furnace which is capable of long life. The new design improves significantly protection against particle contamination and the escape of particles into the furnace bore, and provides a more accurate and reliable furnace assembly. Also, each of the discs 91 and 105 has the dual function of providing seals through its compliant action with the sleeve 82 and the beaker sidewall 76, and of maintaining the sleeve in alignment with the susceptor 80.

Figure 7:
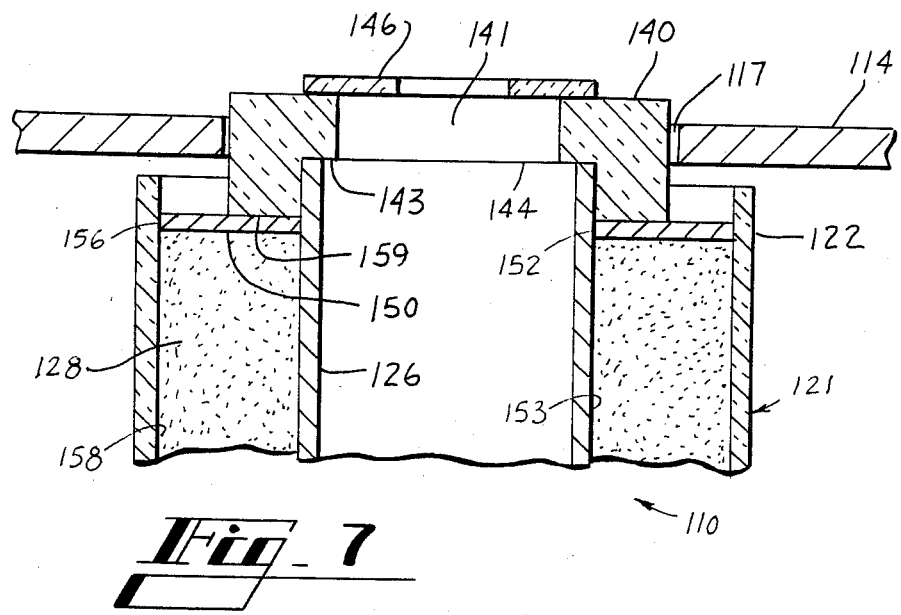
FIG. 7 is a detail view of a top portion of an alternative embodiment of an induction heating furnace.
Figure 8:
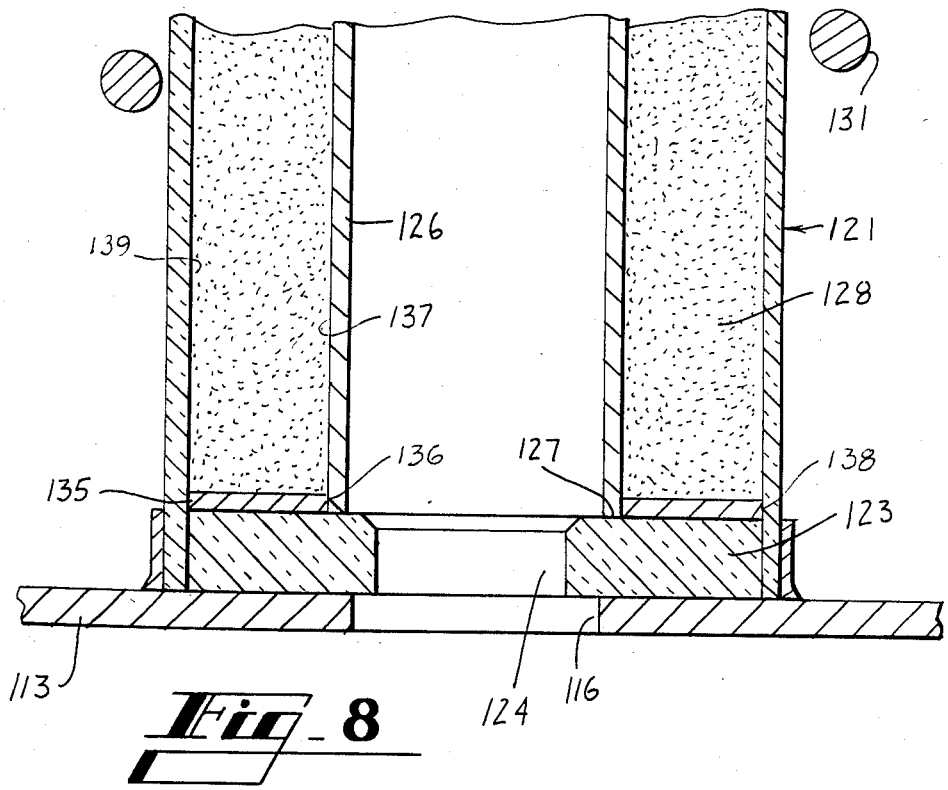
FIG. 8 is a detail view of a bottom portion of the alternative embodiment of the furnace in FIG. 7.

In FIGS. 7 and 8, there is shown an alternative embodiment of the furnace of this invention. A furnace 110 includes a housing having a sidewall (not shown), a base 113 and a top portion 114. The base 113 includes a center opening 116 and the top portion includes an aligned aperture 117. A beaker 121 having an open top 122 includes a base 123 having an opening 124 aligned with the opening 116 and aperture 117. A tubular susceptor 126 which is in the form of a single tube is located vertically within the beaker 121 and has its lower peripheral rim seated in engagement with a top surface 127 of the base 123. The annular volume between the inner surface of the beaker 121 and the outer surface of the susceptor 126 is filled with insulating grain 128. An RF induction coil 131 is mounted about the beaker 121.

As in the preferred embodiment, an arrangement is provided at the base for preventing any inadvertent lateral movement of the susceptor 126 across the base. This arrangement also reduces the escape of particles of dust into the interior of the susceptor 126. Placing an annular disc 135, which resembles felt and which may be made of a compliant material such as alumina-silica, for example, snugly about the susceptor 126 at the lower end and the inside bottom of the base blocks this path (see FIG. 8). This disc 135 also collects zirconia dust. Inasmuch as this embodiment does not include a sleeve, an inner peripheral surface 136 of the disc 135 engages an outer surface 137 of the susceptor 126. An outer surface 138 of the disc 135 engages the inner surface 139 of the beaker sidewall as before to provide a snug fit. As can be seen in FIG. 8, the base 113 may be formed with an opening which is not counterbored. In that event, the disc 135 prevents lateral movement of the susceptor 126 on the base 113. This helps to maintain alignment of the furnace bore with the preform 12 suspended above the furnace. Should the susceptor 126 be enclosed with a sleeve, the disc 135 engages the sleeve and prevents lateral movement thereof.

As in the preferred embodiment, a cap 140 (see FIG. 7) is supported above the furnace bore. The cap 140 has a stepped opening 141 formed centrally thereof to provide a single ledge 143. An upper peripheral rim 144 of the susceptor 126 engages the ledge 143 to support the cap. The opening 141 is large enough to accommodate all expected sizes of preforms 12—12. Supported in engagement with the cap 140 is a disc 146 which is similar in construction and function to the disc 108 in the preferred embodiment.

A second annular disc 150 (see FIG. 7) is positioned at the top of the beaker 121 and covers the insulating grain. It prevents particles from being carried by random air currents as a result of a chimney effect or the ambient air, or stray air currents. This disc also serves as a retainer for the top end of the susceptor 126, thus maintaining more precisely the alignment of the furnace bore with the preform 12.

As can be seen in FIG. 7, an inner peripheral surface 152 of the disc 150 engages compliantly the outer surface 153 of the susceptor 126 whereas an outer peripheral 156 of the disc engages compliantly the inner surface 158 of the beaker 121. A lower surface 159 of the cap 140 engages the top surface of the disc 150. This arrangement provides seals to prevent the movement of particles of insulating grain around the disc 150 and into the furnace bore and preform region. Also, the disc 150 collects particulates which tend to be carried upwardly.

It is to be understood that the above-described arrangements are simply illustrative of the invention. Other arrangements may be devised by those skilled in the art which will embody the principles of the invention and fall within the spirit and scope thereof.

What is claimed is:

1. A furnace for heating a preform in order to draw lightguide fiber therefrom, said furnace comprising:
    a container which includes a sidewall and a base having an opening therethrough;
    a tubular element having a bore into which the preform extends, said tubular element being supported on said base in alignment with said opening and enclosed by said sidewall;
    means for causing the temperature of an optical preform which extends into said bore to be increased to facilitate the drawing of lightguide fiber therefrom;
    insulating means disposed between said sidewall of said container and said tubular element; and
    sealing means engaging said insulating means and extending across said base between and in compliant engagement with said container and said tubular element for preventing substantially the movement of contaminating particulates from said insulating means into the bore and for preventing unintended lateral movement of the tubular element.

2. The furnace of claim 1, wherein said sealing means includes an annular, felt-like disc which has an inner peripheral surface in engagement with an outer surface of said tubular element and an outer peripheral surface which is in engagement with an inner surface of said container sidewall, said sealing means collecting particulates from said insulation means and providing a seal at interfaces with said tubular element and said container.

3. The furnace of claim 2, wherein said disc engages said base of said container.

4. The furnace of claim 3, wherein said opening in said base of said container is stepped to provide an annular ledge on which is seated a peripheral rim of said tubular element.

5. The furnace of claim 2, said furnace also including a cap having a centrally disposed opening which is aligned with said opening of said container and which is stepped to provide an annular ledge such that an upper peripheral rim of said tubular element is in supportive engagement with the ledge formed by said stepped opening.

6. The furnace of claim 5, wherein said disc is a first disc and said furnace also includes a second annular, felt-like disc which encloses a top of said insulating means and which provides a seal between said insulating means and said tubular element, said second disc having an inner peripheral surface in engagement with an outer surface of said tubular element and an outer peripheral surface in engagement with an inner surface of said container.

7. The furnace of claim 6, wherein said discs are made of an alumina-silica material.

8. The furnace of claim 1, wherein said tubular element is a sleeve and said furnace also includes a tubular heating element which is disposed concentrically within and spaced from said sleeve and which is inductively coupled to said means for increasing the temperature whereupon the temperature of said tubular heating element is increased to heat the preform.

9. The furnace of claim 1, wherein said sealing means extends coextensively with said insulation means between said sidewall and said tubular element.

10. An induction heating furnace for heating an optical preform, said furnace comprising:
    a housing which includes a base having an opening formed therethrough;
    a beaker which is disposed within said housing, said beaker including a base which is in engagement with said base of said housing and a sidewall, said base of said beaker having a stepped opening which extends centrally therethrough in alignment with the opening through said base and which provides an annular ledge;

a tubular susceptor which is disposed in said beaker and into which a portion of the preform extends, said susceptor having a lower peripheral surface being disposed in engagement with said ledge of said stepped opening of said beaker base;

a sleeve which is disposed concentrically about said susceptor and spaced therefrom, said sleeve being supported in engagement with said base of said beaker, and said beaker providing an annulus between its sidewall and said sleeve;

insulating grain surrounding said sleeve and disposed within said annulus between said sleeve and said beaker sidewall;

mean for heating said susceptor; and sealing means disposed between said insulating grain and said base of said beaker within said beaker and which is in compliant engagement with said beaker sidewall and said sleeve for preventing the movement of insulating grain into the interior of said susceptor and for maintaining the sleeve disposed concentrically about said susceptor.

11. The furnace of claim 10, wherein said furnace also includes a cap having a centrally disposed stepped opening which is aligned with said susceptor and with said stepped opening in said beaker base, the stepped opening in said cap being formed to include outer and inner annular ledges, the inner ledge being closer to the interior of the furnace and being in engagement with an upper peripheral rim of said susceptor and an upper peripheral rim of said sleeve extending toward but being spaced from the outer ledge of said cap.

12. The furnace of claim 11, wherein said sealing means is an annular felt-like disc having an inner peripheral surface which is in engagement with an outer surface of said sleeve and an outer peripheral surface which is in engagement with an inner surface of said beaker sidewall.

13. The furnace of claim 12, wherein said disc is a first disc and said furnace also includes a second felt-like disc which encloses a top of said insulating grain and which provides a seal between said insulating grain and said susceptor, said second disc also being annular and having an inner peripheral surface in engagement with an outer surface of said sleeve and an outer peripheral surface in engagement with an inner surface of said beaker.

14. The furnace of claim 13, wherein said discs are made of an alumina-silica material.

15. The furnace of claim 10, wherein said susceptor includes a plurality of segments which are stacked within said sleeve.

* * * * *